US009494080B2

(12) United States Patent
Neate et al.

(10) Patent No.: US 9,494,080 B2
(45) Date of Patent: Nov. 15, 2016

(54) FUEL PUMPING UNIT

(71) Applicant: ROLLS-ROYCE CONTROLS AND DATA SERVICES LIMITED, Derby, Derbyshire (GB)

(72) Inventors: David Nicholas Neate, Warwickshire (GB); Jonathan Masters, Birmingham (GB)

(73) Assignee: ROLLS-ROYCE CONTROLS AND DATA SERVICES LIMITED, Derby (GB)

(*) Notice: Subject to any disclaimer, the term of this patent is extended or adjusted under 35 U.S.C. 154(b) by 408 days.

(21) Appl. No.: 14/246,760

(22) Filed: Apr. 7, 2014

(65) Prior Publication Data

US 2014/0338759 A1 Nov. 20, 2014

(30) Foreign Application Priority Data

May 20, 2013 (GB) .................................. 1309049.3

(51) Int. Cl.
*F02C 7/236* (2006.01)
*F04C 11/00* (2006.01)
(Continued)

(52) U.S. Cl.
CPC ................ *F02C 7/236* (2013.01); *F02C 7/14* (2013.01); *F02C 7/16* (2013.01); *F04B 23/12* (2013.01); *F04C 2/18* (2013.01); *F04C 11/005* (2013.01);
(Continued)

(58) Field of Classification Search
CPC .......... F02C 7/22; F02C 7/236; F04D 13/12; F04D 15/0072; F04D 27/006; F04D 29/5893; F04B 23/12; F04B 23/14
USPC ...... 60/39.465; 417/366, 373, 243; 277/597; 165/135, 136; 415/177, 178
See application file for complete search history.

(56) References Cited

U.S. PATENT DOCUMENTS 2,625,106 A * 1/1953 Hoffman ................ F04D 13/12 417/201
2,713,244 A * 7/1955 Chaudler ............... F02C 7/236 417/202

(Continued)

FOREIGN PATENT DOCUMENTS

DE 4418639 A1 12/1994
GB 2203490 A 10/1988

(Continued)

OTHER PUBLICATIONS

May 21, 2014 Search Report issued in European Patent Application No. 14161612.8.

*Primary Examiner* — Alexander Comley
(74) *Attorney, Agent, or Firm* — Oliff PLC

(57) ABSTRACT

A fuel pumping unit has a low pressure pump, a high pressure pump, and a drive input which drives the low and high pressure pumps. The low pressure pump supplies, in use, fuel at a boosted pressure to the high pressure pump. The fuel pumping unit further has a low pressure housing containing the low pressure pump, and a high pressure housing containing the high pressure pump. The housings are joined together at a housing interface. The drive input is contained in one of the housings, whereby drive from the drive input is transferred across the interface to the pump in the other housing. The housing interface includes a gap which interposes between the high pressure pump and the low pressure pump. A layer of substantially stagnant fuel is trapped, in use, in the gap to reduce heat transfer from the high pressure pump to the low pressure pump.

14 Claims, 4 Drawing Sheets

51 51a 51b 30 54 56 50 52 72 48 C 58 66 67 46 60 44 42 31 38 38 36 32 34 40 64 62

(51) Int. Cl.

| | |
|---|---|
| ***F04C 15/00*** | (2006.01) |
| ***F04B 23/12*** | (2006.01) |
| ***F02C 7/14*** | (2006.01) |
| ***F02C 7/16*** | (2006.01) |
| ***F04C 2/18*** | (2006.01) |

(52) U.S. Cl.

CPC ... *F04C 15/0096* (2013.01); *F04C 2210/1044* (2013.01); *Y10T 137/6579* (2015.04)

(56) References Cited

U.S. PATENT DOCUMENTS 2,782,595 A * 2/1957 Pauly ...................... F02C 7/236 417/203
2,877,839 A * 3/1959 Cody ........................ F02C 7/22 417/299
3,026,929 A * 3/1962 Burns .................... B64D 37/16 417/201
3,056,354 A * 10/1962 Gerard ...................... F04D 7/06 417/373
3,614,269 A * 10/1971 Lanctot ................... F02C 7/236 417/233
3,635,602 A * 1/1972 Grennan ............... F04C 11/006 417/201
3,733,816 A * 5/1973 Nash ......................... F02C 7/12 415/179
3,908,360 A * 9/1975 Meyer ..................... F02C 7/236 60/39.281
4,239,462 A * 12/1980 Dach ................... F04D 29/5893 417/373
4,332,527 A 6/1982 Moldovan et al.
4,339,917 A 7/1982 LaGrone
4,586,468 A * 5/1986 Dzioba ................... B60T 17/02 123/198 C
4,720,248 A * 1/1988 Dernedde ........... F04D 29/5893 417/373
4,918,917 A * 4/1990 Woods .................... F01N 3/043 60/280
5,110,269 A * 5/1992 Fallon ..................... F02C 7/236 417/283
5,378,130 A * 1/1995 Ozeki ................... F04C 11/001 418/102
5,403,150 A * 4/1995 McEachern, Jr. ..... F01D 25/125 384/478
5,613,844 A * 3/1997 Tuckey .................. F02M 37/10 123/509
5,626,460 A * 5/1997 Franke ................ F04D 29/5893 415/177
5,785,013 A * 7/1998 Sinn .................... F04D 29/5813 123/41.44
6,240,904 B1 * 6/2001 Meyer .................... F02M 37/18 123/495
6,446,437 B1 * 9/2002 Smith ..................... F02C 7/236 123/510
6,634,854 B1 * 10/2003 Albrecht ............. F04D 29/5893 415/178
6,682,321 B1 * 1/2004 Mukherjee ............ F01D 25/125 415/178
7,484,556 B2 * 2/2009 Mita ........................ C09K 5/06 165/135
8,127,748 B2 3/2012 Yates
2005/0232784 A1 * 10/2005 Yates .................... F04C 11/001 417/199.1
2005/0279079 A1 12/2005 Baryshnikov et al.
2009/0004029 A1 * 1/2009 Wegner ............... F02B 29/0462 417/243
2010/0024778 A1 * 2/2010 Yates ...................... F02C 7/236 123/495
2013/0036738 A1 2/2013 Pora

FOREIGN PATENT DOCUMENTS

WO 2005/017360 A1 2/2005
WO 2011/135240 A1 11/2011

* cited by examiner

FUEL PUMPING UNIT

FIELD OF THE INVENTION

The present invention relates to a fuel pumping unit, and in particular to a fuel pumping unit suitable for supplying fuel to an aero-engine.

BACKGROUND OF THE INVENTION

A typical fuel pumping system for an aero-engine comprises a low pressure (LP) pumping stage operable to draw fuel from a fuel tank, and supplying the fuel at boosted pressure to the inlet of a high pressure (HP) pumping stage. The LP pumping stage typically comprises a centrifugal impeller pump whilst the HP pumping stage typically comprises a positive displacement pump in the form of a twin pinion gear pump. The LP and HP stages are typically connected by a gear train to a common drive input, which facilitates a compact system and helps the LP and HP stages to operate synchronously. US 2010/024778 describes such a system.

The inter-stage flow between LP and HP pumping stages is typically used to cool engine lubrication oil in a fuel/oil heat exchanger. Accordingly, while the fuel in the LP pumping stage may typically be at a temperature of around 70° C., the fuel in the HP pumping stage may be at a temperature of around 140° C.

Not all the fuel exiting the HP pumping stage may be burnt in the engine. A substantial proportion may be recirculated back to the pumping system. For example, when the engine is operating at altitude where the engine burns little fuel, there may be significant fuel recirculation, raising the temperature of the fuel in the pumping system.

In addition, fuel pumping systems are typically compact, reduced mass designs constructed from highly conductive materials such as aluminium alloy. These can result in the LP pumping stage being exposed to high levels of heat transfer from the HP pumping stage. For example, heat produced by the rotating gears of the HP pumping stage can transfer into the LP pumping stage.

Consequently, when the engine is operating at altitude there can be a risk of flashing or vaporising of fuel at the inlet to the LP stage.

SUMMARY OF THE INVENTION

The present invention seeks to provide a pumping unit which reduces heat transfer, e.g. cause by forced convection and conduction, and thereby reduces the risk of fuel flashing or vaporising.

Accordingly, in a first aspect, the present invention provides a fuel pumping unit having a low pressure pump, a high pressure pump, and a drive input which drives the low and high pressure pumps, the low pressure pump supplying, in use, fuel at a boosted pressure to the high pressure pump;

wherein the fuel pumping unit further has a low pressure housing containing the low pressure pump, and a high pressure housing containing the high pressure pump, the housings being joined together at a housing interface, and the drive input being contained in one of the housings, whereby drive from the drive input is transferred across the interface to the pump in the other housing; and wherein the housing interface includes a gap which interposes between the high pressure pump and the low pressure pump, a layer of substantially stagnant fuel being trapped, in use, in the gap to reduce heat transfer from the high pressure pump to the low pressure pump.

As there may be only a small pressure difference across the fuel layer, and the fuel in the layer is substantially stagnant, heat transfer across the layer is limited to conduction. Thus a temperature gradient can be created across the layer, resulting in limited heat transfer to the low pressure pump. In this way, the layer of stagnant fuel helps to thermally isolate the low pressure pump, which can extend the operating envelope of the pumping unit, particularly when operating with volatile fuels. However, such an arrangement for limiting heat transfer can still allow the production of compact and lightweight pump unit designs.

In a second aspect, the present invention provides a fuel pumping system having the fuel pumping unit according to the first aspect and a fuel/oil heat exchanger which uses the fuel to cool lubrication oil, a fuel inlet of the fuel/oil heat exchanger receiving fuel from the low pressure pump and a fuel outlet of the fuel/oil heat exchanger supplying fuel to the high pressure pump.

The fuel pumping unit of the first aspect may be suitable for pumping fuel for an aero-engine, such as a gas turbine engine. Indeed, in a third aspect, the present invention provides an aero-engine having the fuel pumping unit of the first aspect or the fuel pumping system of the second aspect.

Optional features of the invention will now be set out. These are applicable singly or in any combination with any aspect of the invention.

The low pressure pump may be a centrifugal pump.

The high pressure pump may be a gear pump.

The low and high pressure pumps may be gear-driven pumps, and the fuel pumping unit may further have a gear train which operatively connects the low and high pressure pumps to the drive input.

The drive input may be contained in the high pressure housing, whereby drive from the drive input is transferred across the housing interface to the low pressure pump.

The gear train may be lubricated by the fuel.

The gap in which the layer of stagnant fuel is trapped may extend over at least 30%, and preferably over at least 50%, of the area of the housing interface.

The gap may be at most 1.5 mm wide. The gap may be at least 0.5 mm wide. Typically, the gap may be about 0.75 mm wide. For a given thermal gradient, a wider gap size can allow the trapped fuel to maintain a larger temperature difference. However, a wider gap can also encourage convection in the trapped fuel, reducing the thermal gradient.

The fuel may leak into the gap from the high pressure housing to form the layer of stagnant fuel.

The fuel pumping unit may further have a spacer insert located at the housing interface, the gap being formed between a surface of the spacer insert and a surface of the low or high pressure housing (typically the low pressure housing). Thus the spacer insert can help to accurately define the gap thickness.

In addition, however, the spacer can help to spread heat laterally (i.e. parallel to the interface) to avoid hot spots forming at the interface. Thus the spacer insert may be formed from a material having a thermal conductivity of at least 100 $Wm^{-1}K^{-1}$. For example, the spacer insert may be formed from aluminium alloy.

Conveniently, the spacer insert may be located in a recess formed in the low or high pressure housing (typically the low pressure housing).

The spacer insert may include an aperture through which drive from the drive input is transferred across the interface to the pump in the other housing.

The fuel pumping unit may further have one or more air gaps at the housing interface. The gaps may be laterally spaced and sealed from the gap which traps the fuel layer. Such air gaps can increase the thermal isolation of the low pressure pump from the high pressure pump.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
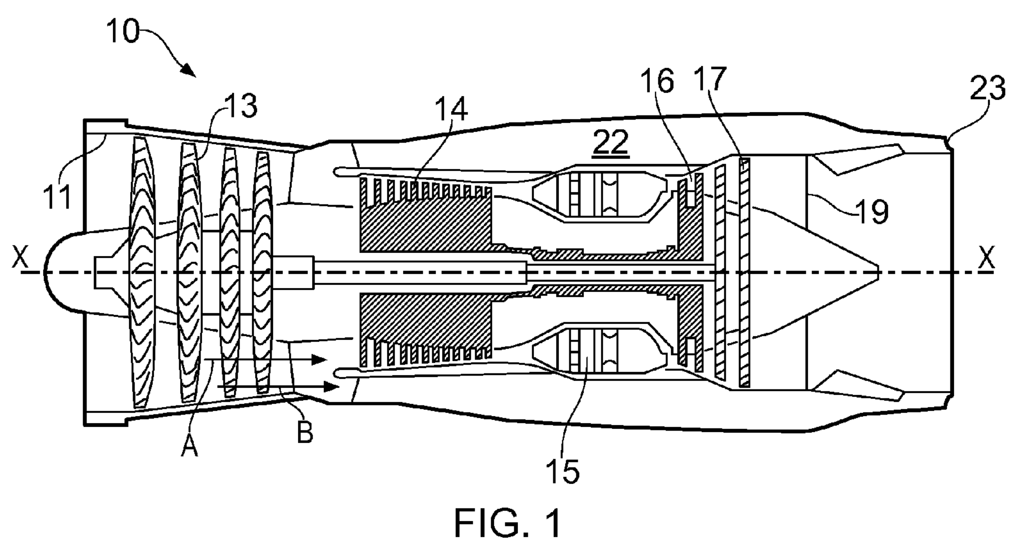
FIG. 1 shows schematically a cross-section through a gas turbine engine.

With reference to FIG. 1, a gas turbine engine incorporating the invention is generally indicated at 10 and has a principal and rotational axis X-X. The engine is a twin-spool by-pass turbo-jet, although the invention is applicable to other forms of engine, such as turbofans. The engine comprises, in axial flow series, an air intake 11, a low pressure compressor 13, a high-pressure compressor 14, combustion equipment 15, a high-pressure turbine 16, a low pressure turbine 17 and a core engine exhaust nozzle 19.

During operation, air entering the intake 11 is compressed by the low pressure compressor 13 and produces two air flows: a first air flow A into the high pressure compressor 14 and a second air flow B which passes through a bypass duct 22 to exit through a bypass exhaust nozzle 23. The high pressure compressor 14 compresses the air flow A directed into it further.

The compressed air exhausted from the high-pressure compressor 14 is directed into the combustion equipment 15 where it is mixed with fuel and the mixture combusted. The resultant hot combustion products then expand through, and thereby drive the high and low-pressure turbines 16, 17 before being exhausted through the nozzle 19 to provide additional propulsive thrust. The high and low-pressure turbines respectively drive the high and low pressure compressors 14, 13 by suitable interconnecting shafts.

Figure 2:
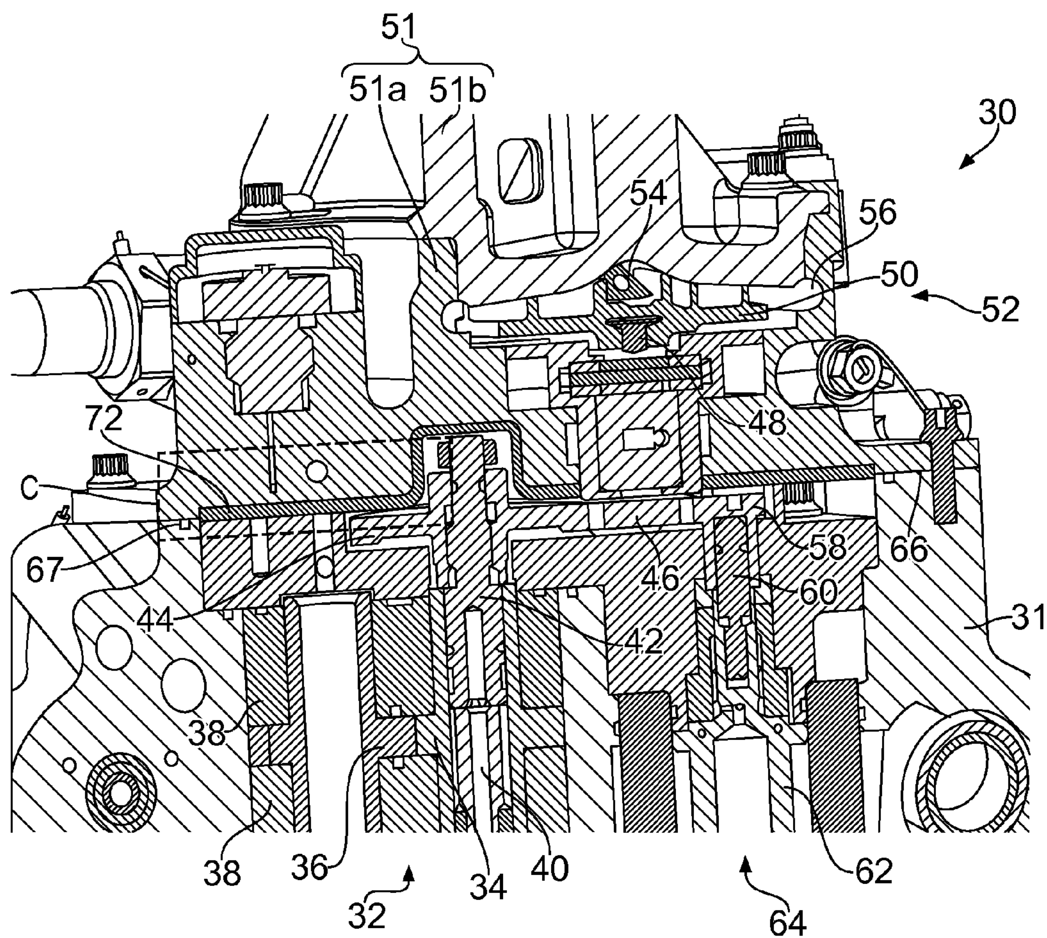
FIG. 2 shows schematically a cross-section through part of a fuel pumping unit.

FIG. 2 shows schematically a cross-section through part of a fuel pumping unit 30 which supplies fuel to the combustion equipment 15 of the engine. The pumping unit 30 has an HP stage and an LP stage.

The HP stage is contained in an HP housing 31, and comprises a positive displacement pump in the form of a gear pump 32. The gear pump 32 is of substantially conventional form, including a first toothed gear 34, and a second toothed gear 36, the teeth of which are meshed with one another, the gears 34, 36 being sandwiched between bearing blocks 38.

The gear pump 32 incorporates an input drive shaft 40 arranged to be driven by a drive output pad of an associated accessory gear box (not shown). The drive shaft 40 is arranged to drive the gear 36 for rotation, which in turn, by nature of the meshing of the gear teeth, drives the gear 34 for rotation. Rotation of the gears 34, 36 positively displaces fuel from an inlet side of the gear pump 32 to an output side thereof, pressurising the fuel at the output side. An extension shaft 42, forming part of the drive shaft 40, is fixed into gear 34, onto which is mounted a drive gear 44 such that rotation of the drive shaft 24 results in operation of the gear pump 32 and in rotation of the drive gear 44.

The drive gear 44 is in meshing engagement with an idler gear 46 mounted upon a drive shaft 48 carrying the impeller 50 of a centrifugal pump 52 forming part of the LP stage.

The LP stage is contained in an LP housing 51, which in turn is formed from an upper housing part **51*b* bolted onto a lower housing part 51*a*. The impeller 50 is mounted for rotation within a cavity formed between the lower 51*a* and upper 51*b* housing parts. An inlet passage 54 opening substantially onto the axis of the impeller 50, and an outlet passage 56 arranged substantially tangentially to the impeller 50 are formed within the LP housing 51, the outlet passage 56 being connected, at its opposite end, to the inlet side of the gear pump 32, via engine pipework, a fuel/oil heat exchanger (FOHE) and a filter (none of which are shown). The inlet passage 54** can be shaped to define a jet pump region (not shown), driven by a proportion of the fuel delivered to the outlet passage.

The idler gear 46 is in meshing engagement with an output gear 58 mounted upon the drive shaft 60 of a rotor 62 of an electrical generator 64, which typically takes the form of a permanent magnet alternator (PMA). As discussed in US 2010/024778, the PMA can be used to supply electrical power to an electronic engine control (EEC) and/or full authority digital engine control (FADEC) associated with the engine.

The drive gear 44, idler gear 46 and output gear 58 are located within the HP housing 31, which contains fuel such that the gears 44, 46, 58 are submerged or drowned in the fuel, the fuel serving to lubricate the gears.

In use, rotation of the input drive shaft 40 by the AGB drives the HP gear pump 32, the LP centrifugal pump 52, and the generator 64 for rotation. The operation of the LP stage results in fuel being drawn from an associated fuel tank and supplied to the inlet side of the HP stage. The jet pump region serves to ensure that the ratio of liquid to vapour of the fluid entering the centrifugal pump 52 is sufficient to maintain good operation thereof, avoiding de-priming and increasing the positive suction pressure attained by the LP stage. The HP stage operates to deliver fuel at high pressure to a fuel metering unit (not shown), controlling the delivery of fuel to the engine.

The lower LP housing part **51*a* is bolted onto the HP housing 31, forming an interface 66 between the HP housing 31 and the LP housing 51. A seal 67 prevents fuel leakage from the unit 30 at the interface. The close proximity of the LP stage to the HP stage across the interface 66 facilitates transfer of the drive from the drive shaft 40 to the LP stage. However, the HP housing 31 and the LP housing 51 are typically formed of aluminium alloy, for lightness and strength. As aluminium is a good thermal conductor, heat transferred into the fuel from oil in the FOHE and further heat generated in the HP gear pump 32 can be readily transferred across the interface 66 into the LP stage. Particularly when the engine is operating at altitude (i.e. a condition where there is typically low fuel demand and consequently high recirculation of heated pumping fuel exiting the HP stage back into the pumping unit 30) there can be a significant increase in the fuel temperature in the LP stage. It desirable that this increase is limited to expand the operating envelope of the pumping unit 30** by avoiding a risk of fuel flashing or vaporising at the inlet to the LP stage.

Figure 3:
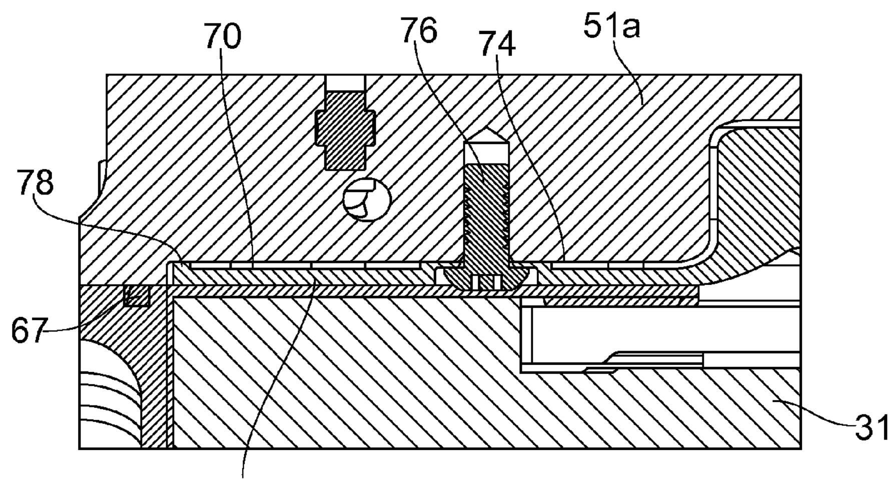
FIG. 3 shows a close-up view of area C from FIG. 2.
Figure 4:
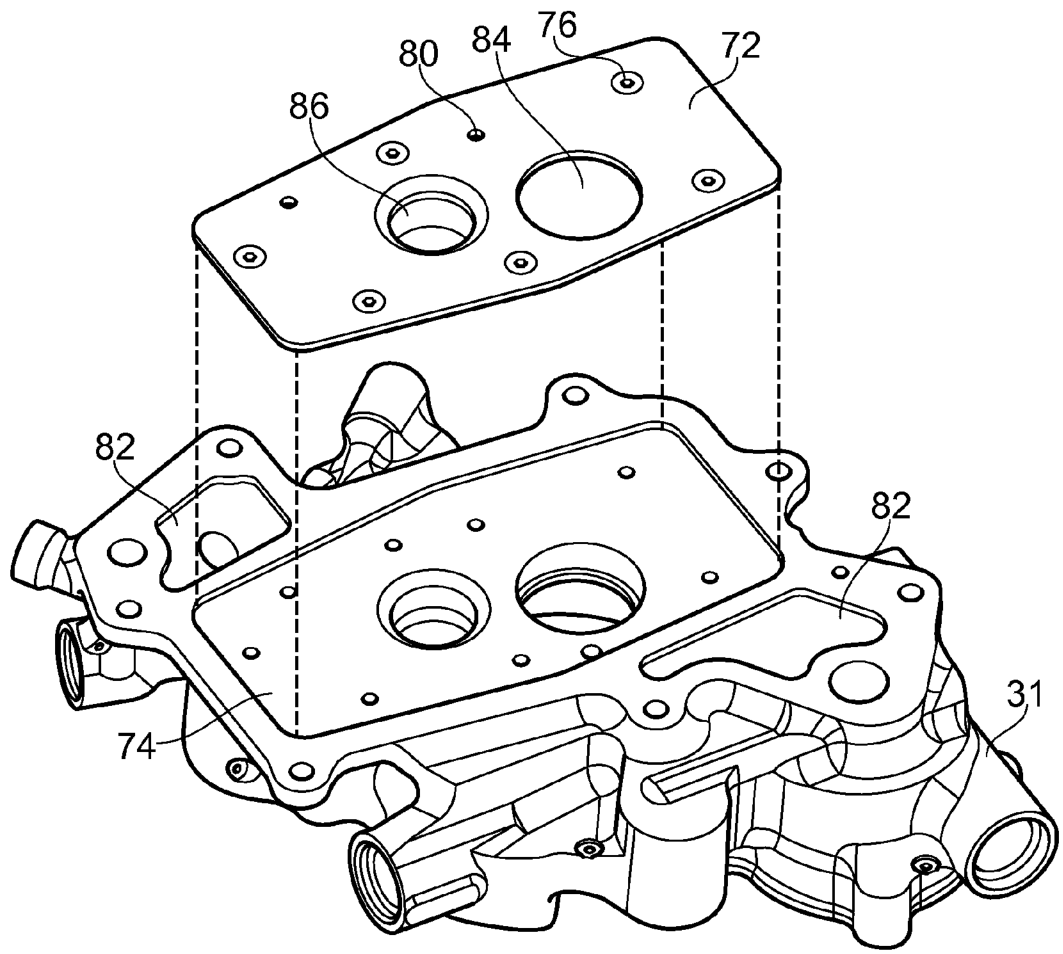
FIG. 4 shows an exploded view of part of a housing for a low pressure pump of the fuel pumping unit of FIG. 2 and a spacer insert which locates in a recess formed in the housing part.
Figure 5:
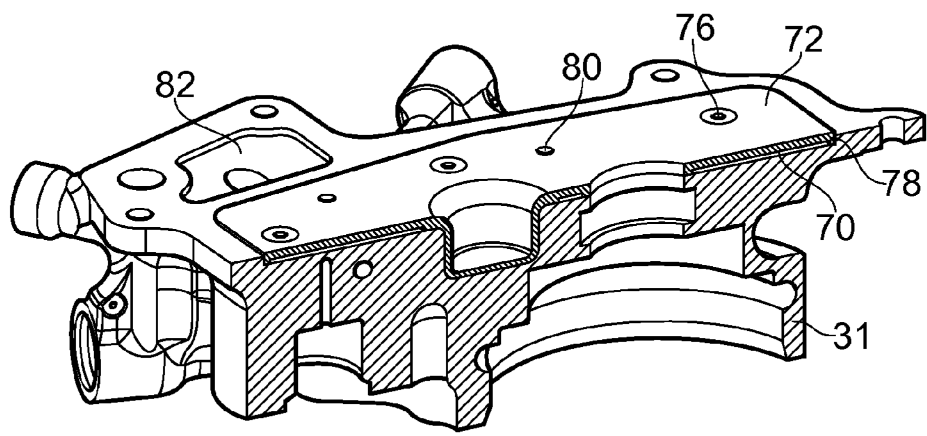
FIG. 5 shows a cross-sectional view of the housing part and spacer insert of FIG. 4 with the spacer insert located in the recess.

Accordingly, the pumping unit 30 has adaptations to reduce the flow of heat from the HP stage to the LP stage, while still allowing a compact and lightweight unit to be formed. In particular, as better shown in FIG. 3 which is a close-up view of the interface 66 of the pump unit 30 at area C from FIG. 2, a gap 70 is interposed between the HP gear pump 32 and the LP centrifugal pump 52, and a layer of substantially stagnant fuel is trapped in the gap, to reduce heat transfer from the high pressure pump to the low pressure pump. At one side of the gap 70 is a surface of a shallow recess 74 formed in the lower LP housing part 51*a*, and at the other side of the gap is an upper surface of a spacer insert 72 which locates in the recess 74. FIG. 4 shows an exploded view of part of the lower housing part 51*a* and the spacer insert 72, and FIG. 5 shows a cross-sectional view of the lower housing part 51*a* with the spacer insert 72 located in the recess 74.

The spacer insert 72 is attached by bolts 76 to the lower housing part 51*a*, and has a peripheral ridge 78 which abuts the lower housing part 51*a* to define the width of the gap 70. The side of the spacer insert 72 facing the HP housing 31 contacts the fuel in which the gears 44, 46, 58 are submerged, and filling holes 80 formed in the insert 72 allow that fuel to leak across the insert 72 into the gap 70 to form the stagnant fuel layer.

The gap 70 formed by the spacer insert 72 may extend across at least 30% or 50% of the area of the interface 66 between the LP stage and the HP stage. At other locations on the interface, insulating air gaps may be formed e.g. by one or more further recesses 82 in the lower housing part 51*a*.

The gap 70 is wide enough such that a significant temperature difference can be formed across the fuel layer in the gap, but not so wide that convection currents would be set up in the layer, i.e. heat transfer across the layer is substantially by conduction only. A gap width in the range from about 0.5 to 1.5 mm generally meets these requirements (a gap width of about 0.75 mm is typical).

The spacer insert 72 may be formed from a material having a relatively high thermal conductivity, such as aluminium alloy to promote the lateral spread of heat, thereby avoiding hot spots forming at the interface 66. A typical thickness for the insert 72 (excluding the peripheral ridge 78) of about 2 mm thick can provide a structure of sufficient rigidity and heat conducting capacity.

The spacer insert 72 has an aperture 84 for the passage therethrough of the drive shaft 48 carrying the LP centrifugal pump 52. The insert 72 also has a hollow 86 on its HP side (and corresponding protuberance on its LP side) to house the end of the extension shaft 42.

Figure 6:
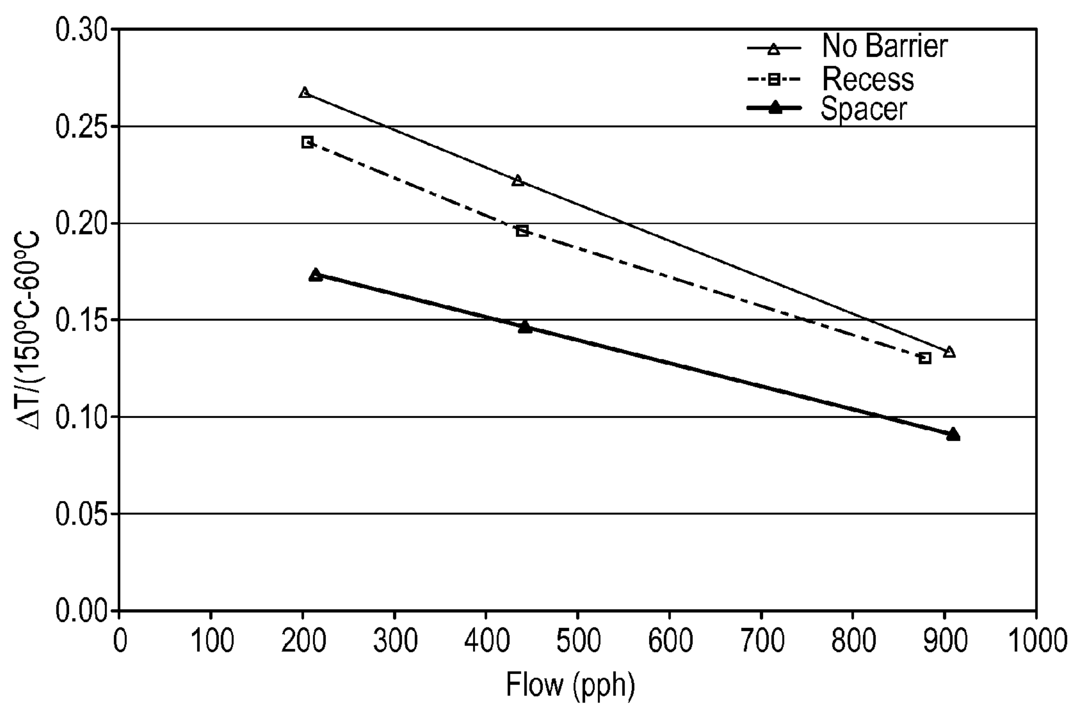
FIG. 6 shows, for different configurations of a fuel pumping unit, plots of normalised temperature increase in the fuel flow across a low pressure pump of the pumping unit against fuel flow rate.

FIG. 6 shows, for different configurations of the fuel pumping unit 30, plots of normalised temperature increase $\Delta T$ in the fuel flow across the LP centrifugal pump 52 against fuel flow rate in pounds weight per hour. The plots were experimentally obtained using a test rig which provided an inlet fuel temperature to the LP stage of 60° C. and an inlet fuel temperature to the HP stage of 150° C., temperatures that may be encountered when the engine is operating at altitude. In configuration "Spacer" the unit 30 was as described above with the aluminium spacer insert 72 located in the recess 74. In configuration "Recess" the unit 30 was as described above but without the aluminium spacer insert 72 located in the recess 74, thereby producing a much thicker fuel layer at the interface 66. In configuration "No Barrier" the unit 30 was as described above but without the aluminium spacer insert 72 and indeed without the recess 74 being machined into the lower LP housing part 51*a* such that there was no fuel layer at the interface 66.

A comparison of the No Barrier and Recess plots shows that introducing an oversized fuel layer at the interface 66 leads to an about 10% reduction in the heat transfer to the LP stage. However, the reduction is relatively small as convention currents set up in the fuel layer reduce the thermal gradient across the layer. In contrast, the Spacer plot shows that when a more optimal, thinner fuel layer is introduced, much greater reductions (about 30%) in heat transfer to the LP stage can be obtained, largely due to the now stagnant state of the fuel in the layer. In addition, the spacer insert 72 can spread heat laterally across the interface 66, helping to avoid the formation of hot spots.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A fuel pumping unit having a low pressure pump, a high pressure pump, and a drive input which drives the low and high pressure pumps, the low pressure pump supplying, in use, fuel at a boosted pressure to the high pressure pump;

wherein the fuel pumping unit further has a low pressure housing containing the low pressure pump, and a high pressure housing containing the high pressure pump, the housings being joined together at a housing interface, and the drive input being contained in one of the housings, whereby drive from the drive input is transferred across the interface to the pump in the other housing;

wherein the housing interface includes a gap which interposes between the high pressure pump and the low pressure pump, a layer of substantially stagnant fuel being trapped, in use, in the gap to reduce heat transfer from the high pressure pump to the low pressure pump; and wherein fuel leaks into the gap from the high pressure housing to form the layer of stagnant fuel.

2. A fuel pumping unit according to claim 1, wherein the gap in which the layer of stagnant fuel is trapped extends over at least 30% of the area of the housing interface.

3. A fuel pumping unit according to claim 1, wherein the gap is at most 1.5 mm wide.

4. A fuel pumping unit according to claim 1, wherein the gap is at least 0.5 mm wide.

5. A fuel pumping unit according to claim 1 which further has a spacer insert located at the housing interface, the gap being formed between a surface of the spacer insert and a surface of the low or high pressure housing.

6. A fuel pumping unit according to claim 5, wherein the spacer insert is formed from a material having a thermal conductivity of at least 100 $Wm^{-1}K^{-1}$.

7. A fuel pumping unit according to claim 5, wherein the spacer insert is formed from aluminium alloy.

8. A fuel pumping unit according to claim 5, wherein the spacer insert is located in a recess formed in the low or high pressure housing.

9. A fuel pumping unit according to claim 5, wherein the spacer insert includes an aperture through which drive from the drive input is transferred across the interface to the pump in the other housing.

10. A fuel pumping unit according to claim 1 which further has one or more air gaps at the housing interface.

11. A fuel pumping unit according to claim 1 wherein the fuel pumping unit is suitable for pumping fuel for an aero-engine.

12. A fuel pumping system having the fuel pumping unit according to claim 1 and a fuel/oil heat exchanger which uses the fuel to cool lubrication oil, a fuel inlet of the fuel/oil heat exchanger receiving fuel from the low pressure pump and a fuel outlet of the fuel/oil heat exchanger supplying fuel to the high pressure pump.

13. An aero-engine having the fuel pumping unit according to claim 1.

14. An aero-engine having the fuel pumping system according to claim 12.

* * * * *